(12) United States Patent
Wang

(10) Patent No.: US 8,739,949 B2
(45) Date of Patent: Jun. 3, 2014

(54) BRAKE MASTER CYLINDER

(75) Inventor: Chun-Chin Wang, Taoyuan County (TW)

(73) Assignee: Heng Kuo Co., Ltd., Taoyuan Hsien (TW)

( * ) Notice: Subject to any disclaimer, the term of this patent is extended or adjusted under 35 U.S.C. 154(b) by 276 days.

(21) Appl. No.: 12/969,790

(22) Filed: Dec. 16, 2010

(65) Prior Publication Data

US 2012/0152673 A1  Jun. 21, 2012

(51) Int. Cl.
*B60T 11/00* (2006.01)

(52) U.S. Cl.
USPC .......................................... 188/344; 92/171.1

(58) Field of Classification Search
USPC .................. 188/24.22, 152, 344; 60/586, 594; 92/171.1
See application file for complete search history.

(56) References Cited

U.S. PATENT DOCUMENTS

| | | | | |
|---|---|---|---|---|
| 2,156,205 A * | 4/1939 | Swift | ............................. | 60/588 |
| 2,757,512 A * | 8/1956 | Foreman | ......................... | 60/548 |
| 4,162,616 A * | 7/1979 | Hayashida | ...................... | 60/533 |
| 5,950,772 A * | 9/1999 | Buckley et al. | ................. | 188/26 |
| 6,871,729 B2 * | 3/2005 | Huster et al. | .............. | 188/24.11 |
| 7,757,488 B2 * | 7/2010 | Dunlap, III | ..................... | 60/594 |
| 2010/0043426 A1 * | 2/2010 | Moore | ........................... | 60/594 |

* cited by examiner

*Primary Examiner* — Bradley King
*Assistant Examiner* — Stephen Bowes
(74) *Attorney, Agent, or Firm* — Jackson IPG PLLC

(57) ABSTRACT

A brake master cylinder of the invention is to dispose a main oil cylinder and an oil storing space on a handlebar base. In addition, a sleeve engaged with the main oil cylinder is disposed in the oil storing space. The one end of the oil storing space has a fastening seat passed by a draw bar linked to the brake handlebar, and a positioning sheath of the fastening seat is utilized to engage with the sleeve. A leakage prevention component is disposed between the fastening seat and the handlebar base. A bushing integrally extended from the leakage prevention component is utilized to encapsulate the positioning sheath of the fastening seat and the sleeve. Accordingly, the brake master cylinder having convenient assembly and better sealing effect for hydraulic oil is obtained.

20 Claims, 3 Drawing Sheets

BRAKE MASTER CYLINDER

BACKGROUND OF THE INVENTION

1. Field of the Invention

The present invention relates to a hydraulic braking device, and more particularly to a brake master cylinder that is conveniently assembled and having better sealing effect for hydraulic oil.

2. Description of the Related Art

A hydraulic brake apparatus utilized in a motorcycle or a bicycle can be taken as one of hydraulic equipment that is in widespread use. A brake master cylinder driven by a brake handlebar is disposed to a handgrip place of the hydraulic brake apparatus. In addition, a braking caliper is disposed to wheels through a hydraulic pipe. When a rider presses the brake handlebar, a piston relatively disposed in a main oil cylinder of the brake master cylinder is driven by the brake handlebar to go forward. Hydraulic oil within the main oil cylinder is pushed into a sub-oil cylinder of the braking caliper to allow a brake pad of the sub-oil cylinder to move toward the brake disc. The brake pad is in contact with the brake disc of the hub to further brake the wheels.

When the rider releases the brake handlebar, the piston in the main oil cylinder or the brake pad at the sub-oil cylinder can back off under the effect of the spring, and the brake handlebar can return to a predetermined angle.

Moreover, after performing braking motion for several times, the brake pad may be worn away (the brake pad is thinned). The reciprocation stroke of the piston must be relatively increased to achieve a desired braking effect. To avoid the brake handlebar from completely reciprocating due to the foregoing factors and to avoid influencing the braking force, an oil pot (or an oil cup) is further disposed to a normal brake master cylinder, and an oil-return hole connected to the oil pot is disposed to a reciprocation stroke place for the piston of the main oil cylinder.

With the state of completely backing the piston off, hydraulic oil within the oil pot is automatically filled into a hydraulic pipe in front of the piston through the oil-return hole. The brake handlebar may not return to a predetermined angle due to the abrasion of the brake pad, and the desired braking effect can be retained.

However, the conventional brake master cylinder usually disposes the oil pot at a radial position of the main oil cylinder of the handlebar base and must dispose a leakage prevention structure at the oil pot and a conjunction channel between the piston and the brake handlebar respectively to prevent hydraulic oil from being leaked. Consequently, it does not only influence the beauty of the brake master cylinder, but also increases the difficulty of assembling the brake master cylinder. Moreover, the sealing effect of hydraulic oil is relatively not good enough.

Therefore, no matter the brake master cylinder applied to the motorcycle or the bicycle has the function of automatically filling hydraulic oil or not, the reliability of the brake master cylinder can be greatly improved if the assembly convenience of the brake master cylinder and the sealing effect for hydraulic oil are actively improved and increased.

SUMMARY OF THE INVENTION

In view of the shortcomings of the prior art, the inventor(s) of the present invention based on years of experience in the related industry to conduct extensive researches and experiments, and finally developed a brake master cylinder that is conveniently assembled and having better sealing effect for hydraulic oil.

To achieve an objective, the brake master cylinder of the invention is to integrally dispose a main oil cylinder and an oil storing space at a handlebar base for installing a brake handlebar. The oil storing space is disposed to an axial position of the main oil cylinder of the handlebar base. One end of the handlebar base is provided with an oil outlet, which relatively corresponds to the main oil cylinder, connected to a hydraulic pipe. One end of the handlebar base is provided with an installation hole corresponding to the oil storing space. In addition, a piston capable of being driven by the brake handlebar is disposed in the main oil cylinder.

The characteristic of the invention is that a sleeve engaged with the main oil cylinder is disposed in the oil storing space of the handlebar base. One end of the piston, which relatively stretches into the main oil cylinder, has a first rubber ring. One end of the piston, which relatively stretches into the sleeve, is provided with a second rubber ring. A fastening seat is disposed at the installation hole of the handlebar base. The fastening seat has a positioning sheath stretching into the oil storing space to engage with the sleeve. In addition, a draw bar passes through a central place of the positioning sheath to link the piston and the brake handlebar. A leakage prevention component is disposed between the fastening seat and the handlebar base.

While in assembly, a channel formed by the installation hole is utilized to sequentially and respectively place the piston, the sleeve and the leakage prevention component into the main oil cylinder and the oil storing space of the handlebar base. Finally, the fastening seat passed by the draw bar is installed to the installation hole of the handlebar base to quickly complete the assembly of the brake master cylinder. More specifically, under the effect of the leakage prevention component, hydraulic oil can be prevented from being leaked through the installation hole and the engaging place between the sleeve and the positioning sheath. Further, hydraulic oil can be prevented from being leaked through the place passed by the draw bar under the effect of the second rubber ring so as to generate better sealing effect for hydraulic oil.

The detail structure of each component in the invention is further depicted.

A bushing for encapsulating the positioning sheath of the fastening seat and the sleeve is integrally extended from the leakage prevention component. An inner flange is disposed to a tail of the bushing. A circular groove for fastening the inner flange is circularly disposed to a periphery of the sleeve.

Under structural forms of integrally extending the bushing for encapsulating the positioning sheath of the fastening seat and the sleeve from the leakage prevention component, disposing the inner flange at the tail of the bushing and circularly disposing the circular groove for fastening the inner flange at the periphery of the sleeve, a stage for plugging the sleeve and the bushing is formed at an engaging place between the main oil cylinder and the oil storing space of the handlebar base to enhance the joint effect between the sleeve and the bushing.

In addition, an external flange clamped between the installation hole and the fastening seat is disposed in front of the leakage prevention component of the invention to ensure the sealing effect between the fastening seat and the installation hole.

While implementing the invention, the handlebar base has at least one first oil-return hole, which is connected to the oil storing space, disposed to a reciprocation place for the first rubber ring in the main oil cylinder so that hydraulic oil within the oil storing space is automatically filled in the hydraulic pipe in front of the first rubber ring through the first oil-return hole under state of allowing the piston to completely fall back. The brake handlebar may not return to a predetermined angle due to the abrasion of the brake pad, and the braking effect can be retained.

While implementing the invention, at least one second oil-return hole connected to the oil storing space is disposed on the sleeve to allow hydraulic oil entering into the sleeve through the second oil-return hole, thereby increasing the lubricating effect between the piston and the sleeve.

Of course, the handlebar base has the first oil-return hole, which is connected to the oil storing space, disposed to a reciprocation place for the first rubber ring in the main oil cylinder, and the second oil-return hole connected the oil storing space is disposed to the sleeve.

While implementing the invention, a spring is disposed to a position between the main oil cylinder and the piston of the handlebar base to generate an active force of restoring the piston. When a rider releases the brake handlebar, the piston steps back, and the brake handlebar linked to the piston is allowed to return to a predetermined angle.

The handlebar base has the first oil-return hole, which is connected to the oil storing space, disposed to the reciprocation place for the first rubber ring in the main oil cylinder and the spring disposed to the position between the main oil cylinder and the piston.

Under the structural form of disposing the second oil-return hole, which is connected to the oil storing space, on the sleeve, the spring is disposed at the position between the main oil cylinder and the piston of the handlebar base.

Similarly, under structural forms of disposing the first oil-return hole, which is connected to the oil storing space, at the reciprocation place for the first rubber ring in the main oil cylinder of the handlebar base and disposing the second oil-return hole, which is connected to the oil storing space, on the sleeve, the spring is further disposed to the place between the main oil cylinder and the piston of the handlebar base.

While implementing the invention, the first rubber ring can be a bowl rubber ring, and the bowl opening of the first rubber ring is arranged toward the oil outlet to relatively speed up the piston to step back. Further, when the piston moves forward, the contact effect between the first rubber ring and the main oil cylinder is relatively increased as well.

While implementing the invention, the first rubber ring can also be a circular rubber ring. The handlebar base further has an oil-return section, in which an inner diameter is relatively larger than an external diameter of the first rubber ring, formed at a position of relatively disposing the first oil-return hole of the main oil cylinder to relatively speed up the first rubber ring passing through the first oil-return hole.

While implementing the invention, the second rubber ring can be a circular rubber ring that is mainly utilized to prevent hydraulic oil from being leaked through the passing place between the piston and the sleeve and to steady the motion of the piston.

While implementing the invention, the piston is provided with a necking section between the first rubber ring and the second rubber ring to contain hydraulic oil, thereby increasing the lubricating effect with respect to the reciprocation motion of the piston.

While implementing the invention, one end of the piston has a ball seat that is relatively toward the fastening seat. The draw bar has a ball end fit to the ball seat. Accordingly, with the steering effect between the ball end and the ball seat, the draw bar can swing by incorporating the brake handlebar.

While implementing the invention, the draw bar is pivotally connected to the brake handlebar through the rotary shaft so that the draw bar can rotate relative to the brake handlebar in accordance with the changed angle of the brake handlebar, thereby exactly linking the brake handlebar and the piston.

Under the structural form of allowing the draw bar to pivotally connect the brake handlebar through the rotary shaft, a thread section is further disposed to the bar body of the draw bar. The rotary shaft has a thread hole threaded to the thread section of the draw bar so that the angle of the brake handlebar can be regulated by rotating the draw bar.

Of course, under the structural forms of disposing the ball seat, which is relatively toward the fastening seat, at one end of the piston and disposing the ball end, which is fit to the ball seat, at the draw bar, the draw bar can also be pivotally connected to the brake handlebar through the rotary shaft.

Under structural forms of disposing the ball seat, which is relatively toward the fastening seat, at one end of the piston and disposing the ball end, which is fit to the ball seat, at the draw bar and allowing the draw bar to pivotally connect the brake handlebar through the rotary shaft, the thread section is further disposed to the bar body of the draw bar, and the rotary shaft is provided with the thread hole threaded to the thread section of the draw bar.

A rod body that is toward the brake handlebar is extended from one end of the piston. The rod body can replace the draw bar, and the brake handlebar has a ball end that is in contact with the rod body. When the brake handlebar swings, the ball end is utilized to push the rod body to perform the reciprocation motion together with the spring to achieve the foregoing motion as well.

By comparing with the conventional brake master cylinder, the brake master cylinder of the invention does not only have beauty, but also improves the assembly convenience and increases the sealing effect for hydraulic oil under the condition of whether there is the function of automatically filling hydraulic oil, thereby greatly improving the reliability of the brake master cylinder.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
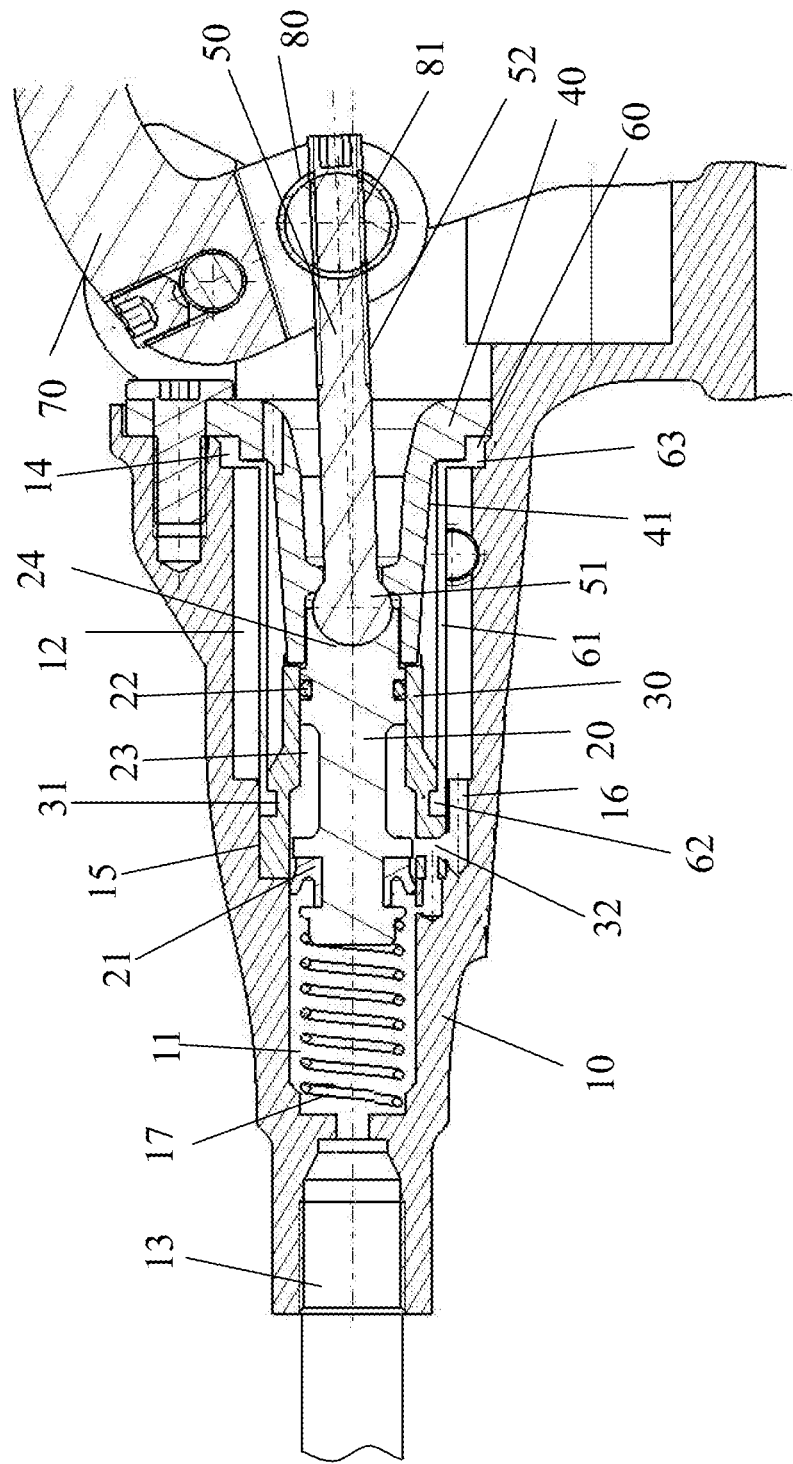
FIG. 1 is a cross-sectional drawing of a brake master cylinder structure according to a first embodiment of the present invention.

With reference to FIG. 1 for a cross-sectional drawing of an axial structure of a brake master cylinder in accordance with a first embodiment of the invention is depicted. The brake master cylinder of the invention is to integrally dispose a main oil cylinder 11 and an oil storing space 12 at a handlebar base 10 for installing a brake handlebar 70. The oil storing space 12 is disposed to an axial position of the main oil cylinder 11 of the handlebar base 10. One end of the handlebar base 10 is provided with an oil outlet 13, which relatively corresponds to the main oil cylinder 11, connected to a hydraulic pipe (not shown in the figure). One end of the handlebar base 10 is provided with an installation hole 14 corresponding to the oil storing space 12. In addition, a piston capable of being driven by the brake handlebar 70 is disposed in the main oil cylinder 11.

A sleeve 30 engaged with the main oil cylinder 11 is disposed in the oil storing space 12 of the handlebar base 10. One end of the piston 20, which relatively stretches into the main oil cylinder 11, has a first rubber ring 21. One end of the piston 20, which relatively stretches into the sleeve 30, is provided with a second rubber ring 22. A fastening seat 40 is disposed at the installation hole 14 of the handlebar base 10. The fastening seat 40 has a positioning sheath 41 stretching into the oil storing space 12 to engage with the sleeve 30. In addition, a draw bar 50 passes through a central place of the positioning sheath 41 to link the piston 20 and the brake handlebar 70.

A leakage prevention component 60 is disposed between the fastening seat 40 and the handlebar base 10. A bushing 61 for encapsulating the positioning sheath 41 of the fastening seat 40 and the sleeve 30 is integrally extended from the leakage prevention component 60. The leakage prevention component 60 is mainly utilized to seal the joint place between the fastening seat 40 and the handlebar base 10 and encapsulates the joint place between the positioning sheath 41 of the fastening seat 40 and the sleeve 30 to prevent hydraulic oil inside the oil storing space 12 from being leaked through the joint place between the positioning sheath 41 of the fastening seat 40 and the sleeve 30.

While assembling the brake master cylinder of the invention, a channel formed by the installation hole 14 is utilized to sequentially and respectively place the piston 20, the sleeve 30 and the leakage prevention component 60 into the main oil cylinder 11 and the oil storing space 12 of the handlebar base 10. Finally, the fastening seat 40 passed by the draw bar 50 is installed to the installation hole 14 of the handlebar base 10 to quickly complete the assembly of the brake master cylinder. More specifically, under multiple effect of the leakage prevention component 60, hydraulic oil can be prevented from being leaked through the installation hole 14 and the engaging place between the sleeve 30 and the positioning sheath 41. Further, hydraulic oil can be prevented from being leaked through the place passed by the draw bar 50 under the effect of the second rubber ring 22 so as to generate better sealing effect for hydraulic oil.

The related structure, functional restriction and generated efficacy of each component in the embodiment of the invention are further depicted.

Under the structural form of integrally extending the bushing 61 for encapsulating the positioning sheath 41 of the fastening seat 40 and the sleeve 30 from the leakage prevention component 60, an inner flange 62 is disposed to a tail of the bushing 61. A circular groove 31 for fastening the inner flange 62 is circularly disposed to a periphery of the sleeve 30. Moreover, a stage 15 for plugging the sleeve 30 and the bushing 61 is formed at an engaging place between the main oil cylinder 11 and the oil storing space 12 of the handlebar base 10 so as to enhance the joint effect between the sleeve 30 and the bushing 61.

In addition, an external flange 63 clamped between the installation hole 14 and the fastening seat 40 is disposed in front of the leakage prevention component 60 to ensure the sealing effect between the fastening seat 40 and the installation hole 14.

While implementing the invention, the handlebar base 10 has at least one first oil-return hole 16, which is connected to the oil storing space 12, disposed to a reciprocation place for the first rubber ring 21 in the main oil cylinder 11 so that hydraulic oil within the oil storing space 12 is automatically filled in the hydraulic pipe in front of the first rubber ring 21 through the first oil-return hole 16 under state of allowing the piston to completely fall back.

While implementing the invention, at least one second oil-return hole 32 connected to the oil storing space 12 is disposed on the sleeve 30 to allow hydraulic oil entering into the sleeve 30 through the second oil-return hole 32, thereby increasing the lubricating effect between the piston 20 and the sleeve 30.

Of course, the handlebar base has the first oil-return hole 16, which is connected to the oil storing space 12, disposed to a reciprocation place for the first rubber ring 21 in the main oil cylinder 11, and the second oil-return hole 32 connected the oil storing space 12 is disposed to the sleeve 30 to automatically fill hydraulic oil into the hydraulic pipe in front of the first rubber ring 21 and to increase the lubricating effect between the piston 20 and the sleeve 30.

While implementing the invention, a spring 17 is disposed to a position between the main oil cylinder 11 and the piston 20 of the handlebar base 10 to generate an active force of restoring the piston 20. When a rider releases the brake handlebar, the piston 20 steps back, and the brake handlebar 70 linked to the piston 20 returns to a predetermined angle.

The handlebar base 10 has the first oil-return hole 16, which is connected to the oil storing space 12, disposed to the reciprocation place for the first rubber ring 21 in the main oil cylinder 11 and the spring 17 disposed to the position between the main oil cylinder 11 and the piston 20. Alternatively, under the structural form of disposing the second oil-return hole 32, which is connected to the oil storing space 12, on the sleeve 30, the spring 17 is disposed at the position between the main oil cylinder 11 and the piston 20 of the handlebar base 10.

Similarly, under structural forms of disposing the first oil-return hole 16, which is connected to the oil storing space 12, at the reciprocation place for the first rubber ring 21 in the main oil cylinder 11 of the handlebar base 10 and disposing the second oil-return hole 32, which is connected to the oil storing space, on the sleeve 30, the spring 17 is further disposed to the place between the main oil cylinder 11 and the piston 20 of the handlebar base 10.

In the embodiment shown in FIG. 1, the first rubber ring 21 can be a bowl rubber ring, and the bowl opening of the first rubber ring 21 is arranged toward the oil outlet 13 to relatively speed up the piston 20 to step back. Further, when the piston 20 moves forward, the contact effect between the first rubber ring 21 and the main oil cylinder 11 is relatively increased as well.

Figure 2:
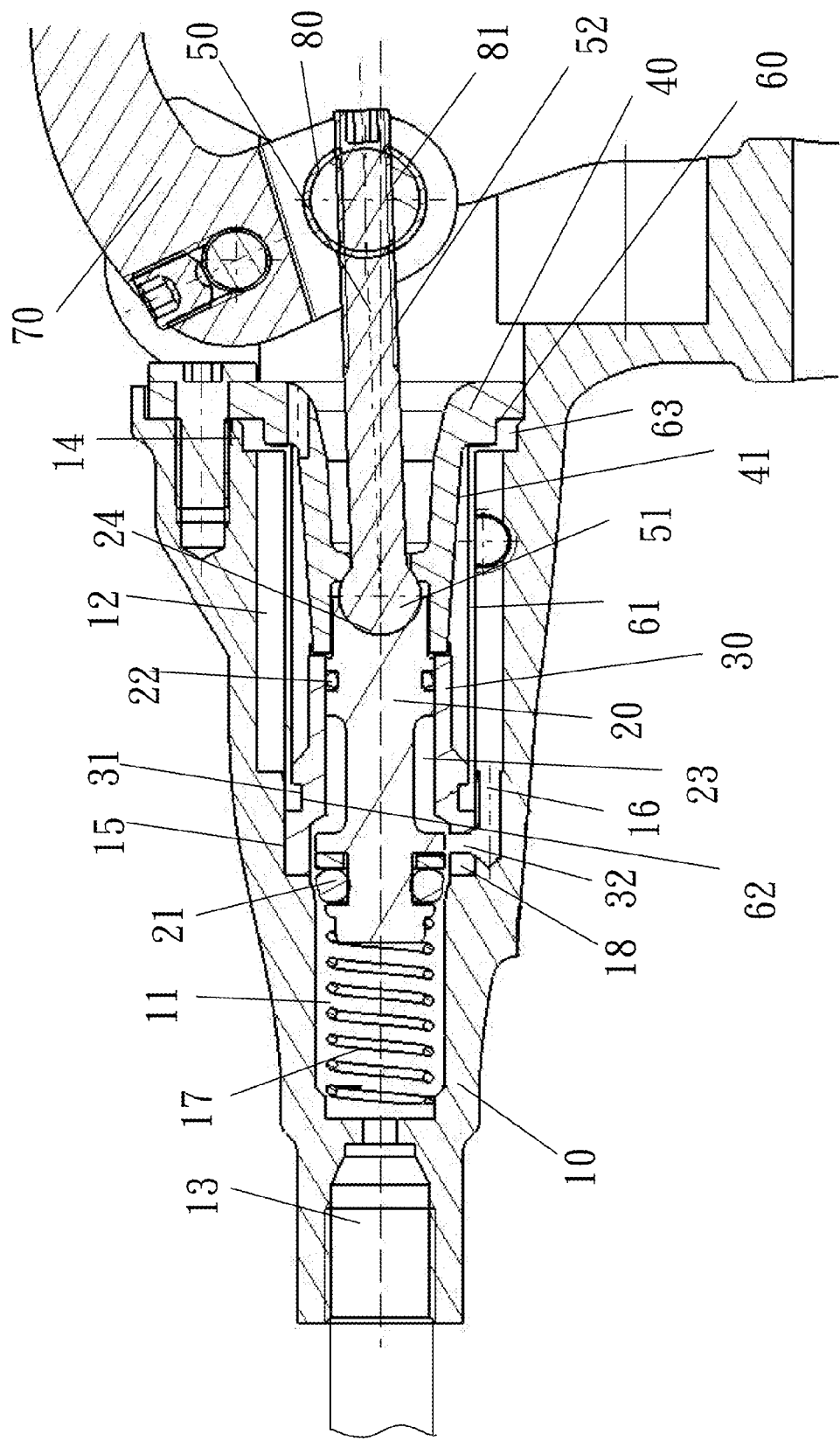
FIG. 2 is a cross-sectional drawing of a brake master cylinder structure according to a second embodiment of the present invention.

Moreover, with reference to FIG. 2 for a cross-sectional drawing of a structure in accordance with a second embodiment of the invention, the first rubber ring 21 can also be a circular rubber ring. The handlebar base 10 further has an oil-return section 18, in which an inner diameter is relatively larger than an external diameter of the first rubber ring 21, formed at a position of relatively disposing the first oil-return hole 16 of the main oil cylinder 11 to relatively speed up the first rubber ring 21 passing through the first oil-return hole 16, thereby increasing the braking sensitivity.

Under the structural forms of two different embodiments shown in FIG. 1 and FIG. 2, the second rubber ring 22 can be a circular rubber ring that is mainly utilized to prevent hydraulic oil from being leaked through the passing place between the piston 20 and the sleeve and to steady the motion of the piston 20.

The piston 20 is provided with a necking section 23 between the first rubber ring 21 and the second rubber ring 22 to contain hydraulic oil, thereby increasing the lubricating effect with respect to the reciprocation motion of the piston 20.

While implementing the invention, one end of the piston 20 has a ball seat 24 that is relatively toward the fastening seat 40. The draw bar 50 has a ball end 51 fit to the ball seat 24. Accordingly, with the steering effect between the ball end 51 and the ball seat 24, the draw bar 50 can swing by incorporating the brake handlebar 70.

The draw bar is pivotally connected to the brake handlebar through a rotary shaft 80 so that the draw bar 50 can rotate relative to the brake handlebar 70 in accordance with the changed angle of the brake handlebar 70, thereby exactly linking the brake handlebar 70 and the piston 20.

Under the structural form of allowing the draw bar 50 to pivotally connect the brake handlebar 70 through the rotary shaft 80, a thread section 52 is further disposed to the bar body of the draw bar 50. The rotary shaft 80 has a thread hole 81 threaded to the thread section 52 of the draw bar 50 so that the angle of the brake handlebar 70 can be regulated by rotating the draw bar 50.

Of course, under the structural forms of disposing the ball seat 24, which is relatively toward the fastening seat 40, at one end of the piston 20 and disposing the ball end 51, which is fit to the ball seat 24, at the draw bar 50, the draw bar 50 can also be pivotally connected to the brake handlebar 70 through the rotary shaft 80.

Under structural forms of disposing the ball seat 20, which is relatively toward the fastening seat 40, at one end of the piston 20 and disposing the ball end 51, which is fit to the ball seat 24, at the draw bar 50 and allowing the draw bar 50 to pivotally connect the brake handlebar 20 through the rotary shaft 80, the thread section 52 is further disposed to the bar body of the draw bar 50, and the rotary shaft 80 has the thread hole 81 threaded to the thread section 52 of the draw bar 50.

Figure 3:
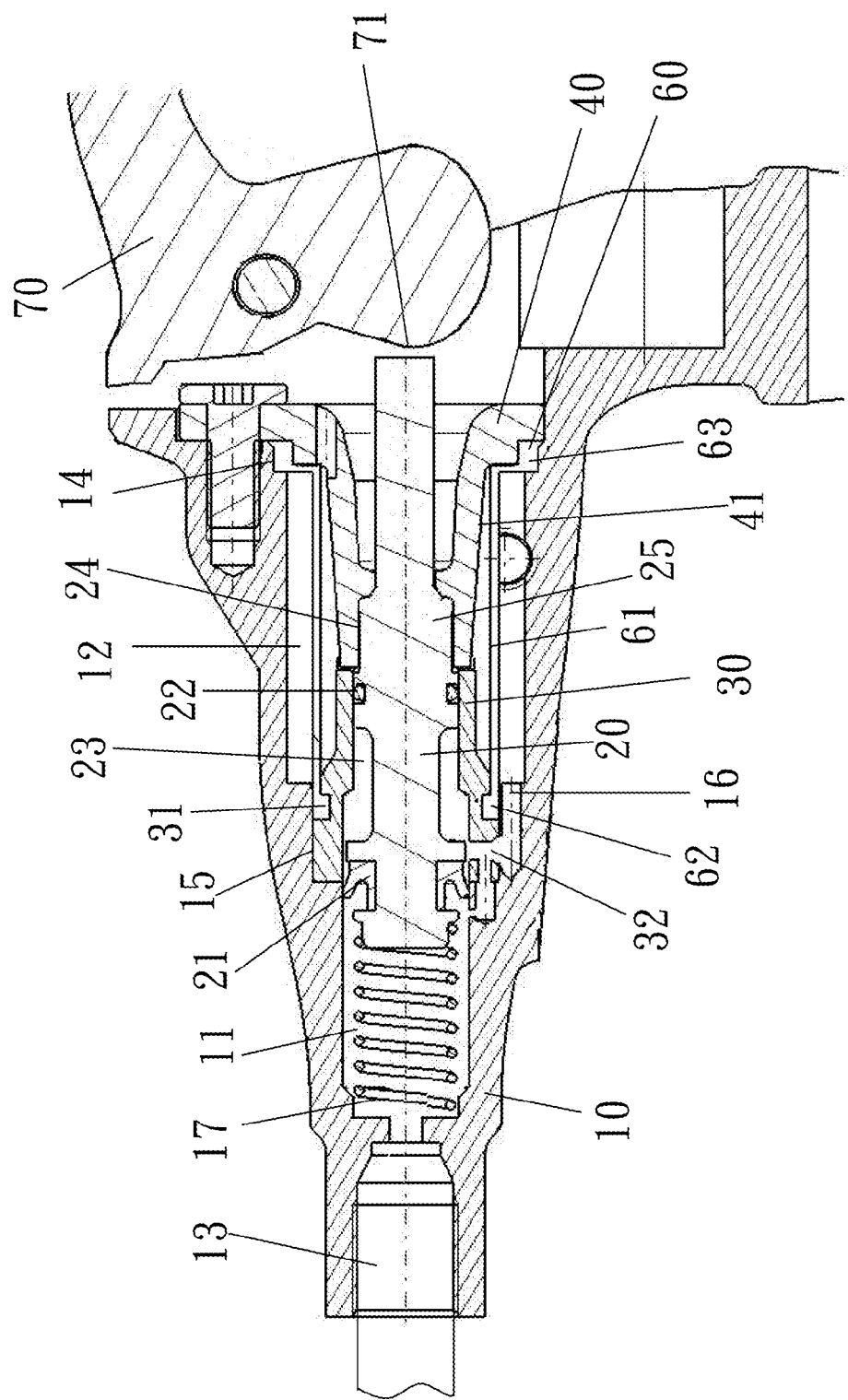
FIG. 3 is a cross-sectional drawing of a brake master cylinder structure according to a third embodiment of the present invention.

According to the embodiment shown in FIG. 3, a rod body 25 that is toward the brake handlebar 70 is extended from one end of the piston 20. The rod body can replace the draw bar 50, and the brake handlebar 70 has a ball end 71 that is in contact with the rod body 25. When the brake handlebar 70 swings, the ball end 71 is utilized to push the rod body 25 to perform the reciprocation motion together with the spring 17 to achieve the foregoing motion as well.

By comparing with the conventional brake master cylinder, the brake master cylinder of the invention does not only have beauty, but also improves the assembly convenience and increases the sealing effect for hydraulic oil under the condition of whether there is the function of automatically filling hydraulic oil, thereby greatly improving the reliability of the brake master cylinder.

The brake master cylinder provided by the invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A brake master cylinder, comprising a main oil cylinder and an oil storing space integrally disposed on a handlebar base of a brake handlebar, the oil storing space having an axial position with respect to the main oil cylinder of the handlebar base, one end of the handlebar base having an oil outlet, which connects to the main oil cylinder via a hydraulic pipe, one end of the handlebar base having an installation hole corresponding to the oil storing space, a piston, which is driven by the brake handlebar, located inside the main oil cylinder, the brake master cylinder being characterized in that:

a sleeve engaged with the main oil cylinder, located inside the handlebar base, one end of the piston, which relatively stretches into the main oil cylinder, having a first rubber ring, one end of the piston, which relatively stretches into the sleeve, having a second rubber ring;

a fastening seat located in the installation hole of the handlebar base, the fastening seat having a positioning sheath that stretches into the handlebar base and has an extension portion protruding inwardly towards the oil outlet to engage with the sleeve to cooperatively define the main oil cylinder, a draw bar passing through a central place of the positioning sheath to link the piston and the brake handlebar; and a leakage prevention component for preventing oil leakage from the main oil cylinder, the leakage prevention component being located between the fastening seat and the handlebar base, a rigid bushing extending from the leakage prevention component to surround the extension portion of the positioning sheath and the sleeve and an inner flange that is disposed to an end of the bushing and engages with the sleeve through a circular groove in the sleeve, so that the bushing and the handlebar base cooperatively define the oil storing space having a fixed volume and the bushing encapsulates the engaged portions of the positioning sheath and the sleeve.

2. The brake master cylinder as recited in claim 1, wherein the bushing for encapsulating the positioning sheath of the fastening seat and the sleeve is integrally extended from the leakage prevention component, and an inner flange is engaged with a tail of the bushing, and a circular groove for fastening the inner flange is located on a periphery of the sleeve.

3. The brake master cylinder as recited in claim 1, wherein the bushing for encapsulating the positioning sheath of the fastening seat and the sleeve is integrally extended from the leakage prevention component, and a tail of the bushing has an inner flange, and a periphery of the sleeve has a circular groove that engages with the inner flange, and a stage for plugging the sleeve and the bushing is formed at an engaging place between the main oil cylinder and the oil storing space of the handlebar base.

4. The brake master cylinder as recited in claim 1, wherein an external flange clamped between the installation hole and the fastening seat is in front of the leakage prevention component.

5. The brake master cylinder as recited in claim 1, wherein at least one first oil-return hole connected to the oil storing space is located at a reciprocation place for the first rubber ring in the main oil cylinder of the handlebar base.

6. The brake master cylinder as recited in claim 1, wherein at least one oil-return hole connected to the oil storing space is located on the sleeve.

7. The brake master cylinder as recited in claim 1, wherein the handlebar base has at least one first oil-return hole, which is connected to the oil storing space, located at a reciprocation place for the first rubber ring in the main oil cylinder, and at least one second oil-return hole connected to the oil storing space is located on the sleeve.

8. The brake master cylinder as recited in claim 1, wherein a spring is located at a place between the main oil cylinder and the piston of the handlebar base.

9. The brake master cylinder as recited in claim 1,
wherein the handlebar base has at least one first oil-return hole, which is connected to the oil storing space, located at a reciprocation place for the first rubber ring in the main oil cylinder, and a spring is located at the place between the main oil cylinder and the piston of the handlebar base.

10. The brake master cylinder as recited in claim 1,
wherein an oil-return hole connected to the oil storing space is disposed on the sleeve, and a spring is disposed to the place between the main oil cylinder and the piston of the handlebar base.

11. The brake master cylinder as recited in claim 1,
wherein the handlebar base has at least one first oil-return hole, which is connected to the oil storing space, disposed to a reciprocation place for the first rubber ring in the main oil cylinder, and a spring is located at the place between the main oil cylinder and the piston of the handlebar base.

12. The brake master cylinder as recited in claim 1, wherein the first rubber ring is a bowl shape.

13. The brake master cylinder as recited in claim 1,
wherein the first rubber ring is a circular rubber ring, and the handlebar base has an oil-return section, in which an inner diameter is relatively larger than an external diameter of the first rubber ring, formed at one first oil-return hole of the main oil cylinder.

14. The brake master cylinder as recited in claim 1, wherein the second rubber ring is a circular cycle.

15. The brake master cylinder as recited in claim 1,
wherein the piston is provided with a necking section between the first rubber ring and the second rubber ring.

16. The brake master cylinder as recited in claim 1,
wherein the draw bar is pivotally connected to the brake handlebar through a rotary shaft.

17. The brake master cylinder as recited in claim 1,
wherein the draw bar is pivotally connected to the brake handlebar through a rotary shaft, and a thread section is disposed to a bar body of the draw bar, and the rotary shaft has a thread hole threaded to the thread section of the draw bar.

18. The brake master cylinder as recited in claim 1,
wherein one end of the piston has a ball seat that is toward the fastening seat, and the draw bar has a ball end fit to the ball seat, and the draw bar is pivotally connected to the brake handlebar through a rotary shaft.

19. The brake master cylinder as recited in claim 1,
wherein one end of the piston has a ball seat that is toward the fastening seat, and the draw bar has a ball end fit to the ball seat, and the draw bar is pivotally connected to the brake handlebar through a rotary shaft, and the rotary shaft has a thread hole threaded to a thread section of the draw bar.

20. The brake master cylinder as recited in claim 1,
wherein a rod body that is toward the brake handlebar is extended from one end of the piston, and the rod body replaces the draw bar, and the brake handlebar has a ball end that is in contact with the rod body, and when the brake handlebar swings, the ball end is utilized to push the rod body to perform a reciprocation motion together with a spring to achieve the foregoing motion.

\* \* \* \* \*